US011123882B2

(12) United States Patent
Souk (10) Patent No.: US 11,123,882 B2
(45) Date of Patent: Sep. 21, 2021

(54) JOINT COVER, ROBOT, AND PARALLEL LINK ROBOT (71) Applicant: Fanuc Corporation, Yamanashi (JP)

(72) Inventor: Hyunchul Souk, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 228 days.

(21) Appl. No.: 16/549,969

(22) Filed: Aug. 23, 2019

(65) Prior Publication Data
US 2020/0078965 A1 Mar. 12, 2020

(30) Foreign Application Priority Data

Sep. 12, 2018 (JP) .............................. JP2018-170775

(51) Int. Cl.
B25J 17/00 (2006.01)
B25J 19/00 (2006.01)
F16C 11/06 (2006.01)
B25J 9/00 (2006.01)

(52) U.S. Cl.
CPC ............ *B25J 19/0075* (2013.01); *B25J 17/00* (2013.01); *F16C 11/06* (2013.01); *B25J 9/003* (2013.01)

(58) Field of Classification Search
CPC ...... B25J 9/0051; B25J 19/0075; B25J 17/00; B25J 9/003; F16C 11/06
See application file for complete search history.

(56) References Cited

U.S. PATENT DOCUMENTS 4,856,795 A * 8/1989 DeLano ................. B29C 43/18
277/635
5,203,522 A 4/1993 White et al.
(Continued)

FOREIGN PATENT DOCUMENTS

EP 2702890 A1 3/2014
EP 2810744 A1 12/2014
GB 2362429 A 11/2001
(Continued)

OTHER PUBLICATIONS

Usui, Takumi; Notice of Reasons for Refusal; Japanese Patent Application No. 2018-170775; dated Oct. 6, 2020; 5 pages.
(Continued)

*Primary Examiner* — Randell J Krug
(74) *Attorney, Agent, or Firm* — Shackelford, Bowen, McKinley & Norton, LLP (57) ABSTRACT

A joint cover is removably attached to a joint of a robot including first and second joint members, and a spherical bearing coupling the first and second joint members, wherein the bearing includes a ball shank including a shaft part fixed to the first joint member and including a ball part at one end of the shaft part, and a holder fixed to an end of the second joint member and including a ball receiver configured to enclose and support the ball part, the joint cover includes a body made of an elastic material and configured to cover the holder and the end of the second joint member, and the body includes two through-holes respectively allowing for insertion of the shaft part and the second joint member, and the joint cover includes a slit configured to open and close and to make the two through-holes continuous with each other.

10 Claims, 9 Drawing Sheets (56) References Cited

U.S. PATENT DOCUMENTS

| | | | |
|---|---|---|---|
| 8,197,153 B2* | 6/2012 | Halcom | F16C 11/0614 |
| | | | 403/114 |
| 2001/0043767 A1 | 11/2001 | Michioka et al. | |
| 2002/0184768 A1 | 12/2002 | Michioka et al. | |
| 2009/0211390 A1 | 8/2009 | Brogardh et al. | |
| 2012/0118097 A1* | 5/2012 | Ilch | B25J 9/0051 |
| | | | 74/490.05 |
| 2014/0083232 A1 | 3/2014 | Go | |
| 2014/0112601 A1 | 4/2014 | Shioda et al. | |
| 2014/0360306 A1 | 12/2014 | Mihara et al. | |
| 2018/0042717 A1* | 2/2018 | Kahook | A61F 2/1694 |

FOREIGN PATENT DOCUMENTS

| | | |
|---|---|---|
| JP | S58-002154 U | 1/1983 |
| JP | H01017898 B2 | 4/1989 |
| JP | H10315988 A | 12/1998 |
| JP | 2002039159 A | 2/2002 |
| JP | 2005343225 A | 12/2005 |
| JP | 2009-067117 A | 4/2009 |
| JP | 2014-046406 A | 3/2014 |
| JP | 3190803 U | 5/2014 |
| JP | 2014237187 A | 12/2014 |
| WO | WO-2012147275 A1 | 11/2012 |

OTHER PUBLICATIONS

Fanuc Corporation, "Instruction manual of robot, (Manual No. B-83084JA/09)", p. 50 and p. 62, Obtained in Aug. 2018.
THK Co., Ltd., "Link Ball, Rod End Series (Catalog No. 380-2)", pp. 2-3, Obtained in Aug. 2018.

* cited by examiner

JOINT COVER, ROBOT, AND PARALLEL LINK ROBOT

CROSS-REFERENCE TO RELATED APPLICATIONS

This application claims the benefit of Japanese Patent Application No. 2018-170775, the content of which is incorporated herein by reference.

TECHNICAL FIELD

The present invention relates to a joint cover, a robot, and a parallel link robot.

BACKGROUND ART

There is known a parallel link robot including a base on which multiple actuators are mounted, multiple arms coupled with the respective actuators, and an end part attached to distal ends of the arms (e.g., see PTL 1). The parallel link robot has a parallel link mechanism, which is a mechanism to support the single end part with the multiple arms arranged parallel to each other.

Each arm includes a driving link driven by the corresponding actuator, and a driven link coupled to the driving link and the end part. A joint between the driving and the driven link and a joint between the driven link and the end part are each constituted by a spherical bearing coupling these members.

A known spherical bearing includes a ball shank having a ball part at one end of a shaft part, a holder having a ball receiver to enclose and support the ball part and coupled with the ball shank so as to be swingable or rotatable relative to the ball shank, and a cylindrical boot seal made of an elastic body and sealing a gap between the ball shank and the holder (see PTL 2). Using the spherical bearing of PTL 2 for the joint of the robot can prevent falling of abrasion powder from the spherical bearing and entry of dust into the spherical bearing while the robot is in operation, as the interface between the ball part and the ball receiver can b e sealed from the outside environment by the boot seal.

CITATION LIST

Patent Literature

{PTL 1}
Japanese Unexamined Patent Application, Publication No. 2014-237187
(PTL 2)
Japanese Unexamined Patent Application, Publication No. 2002-039159

SUMMARY OF INVENTION

According to an aspect of a present invention, there is provided a joint cover removably attached to a joint of a robot, the robot including a first joint member, a second joint member, and a spherical bearing coupling the first joint member and the second joint member such that the first joint member and the second joint member are rotatable or swingable relative to each other, wherein the spherical bearing includes a ball shank and a holder, the ball shank including a shaft part fixed to the first joint member and a ball part at one end of the shaft part, the holder being fixed to an end of the second joint member and including a ball receiver configured to enclose and support the ball part, the joint cover includes a cover body made of an elastic material and configured to cover the holder and the end of the second joint member, and the cover body includes two through-holes respectively allowing for insertion of the shaft part and the second joint member, and the joint cover includes a slit configured to open and close and to make the two through-holes continuous with each other.

DESCRIPTION OF EMBODIMENTS

A joint cover 8 and a parallel link robot (robot) 1 according to an embodiment of the present invention will be described below with reference to the drawings.

Figure 1:
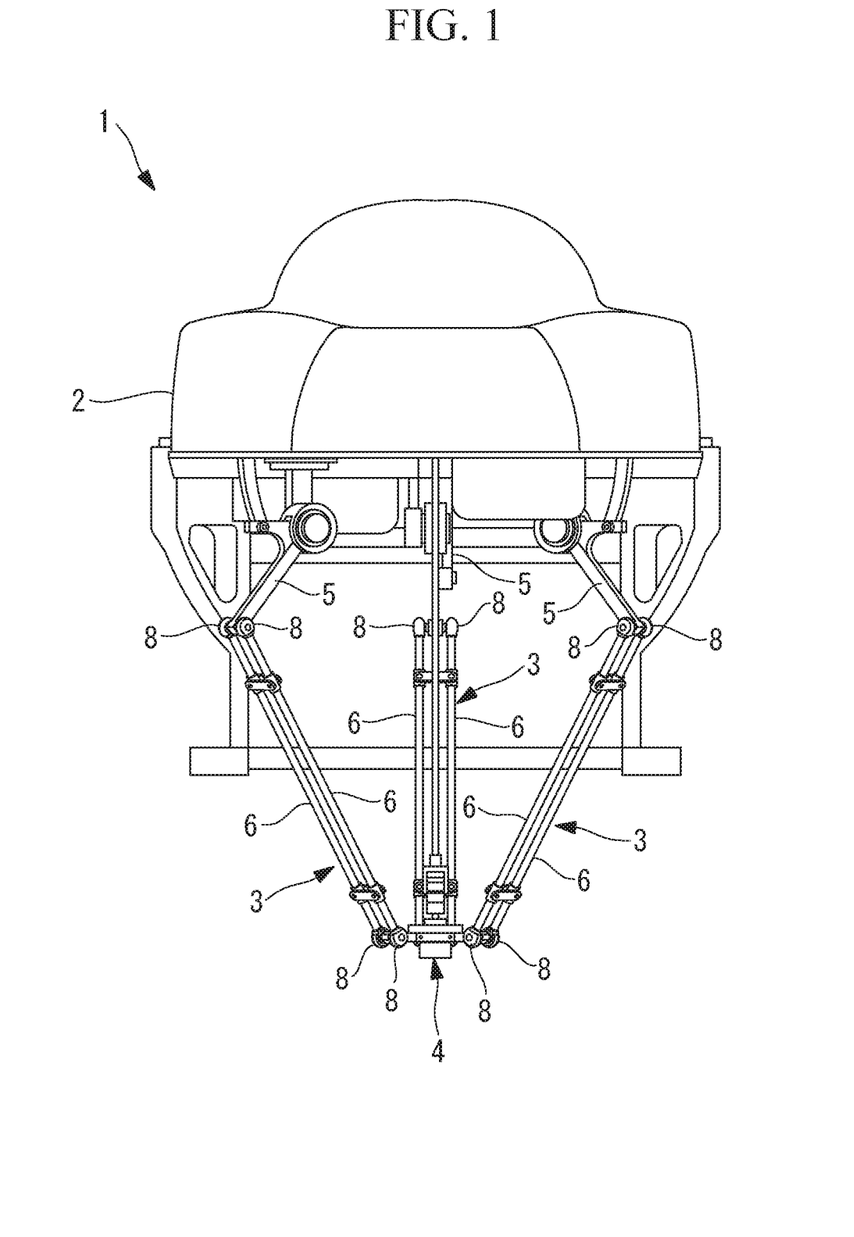
FIG. 1 is a front view of a parallel link robot according to an embodiment of the present invention.

As shown in FIG. 1, the parallel link robot 1 according to the present embodiment includes a base 2 on which multiple (e.g., three) actuators are mounted (not shown in the figure), three arms 3 coupled with the respective actuators, and an end part (the first joint member) 4 connected with a distal end of each arm 3.

Figure 2:
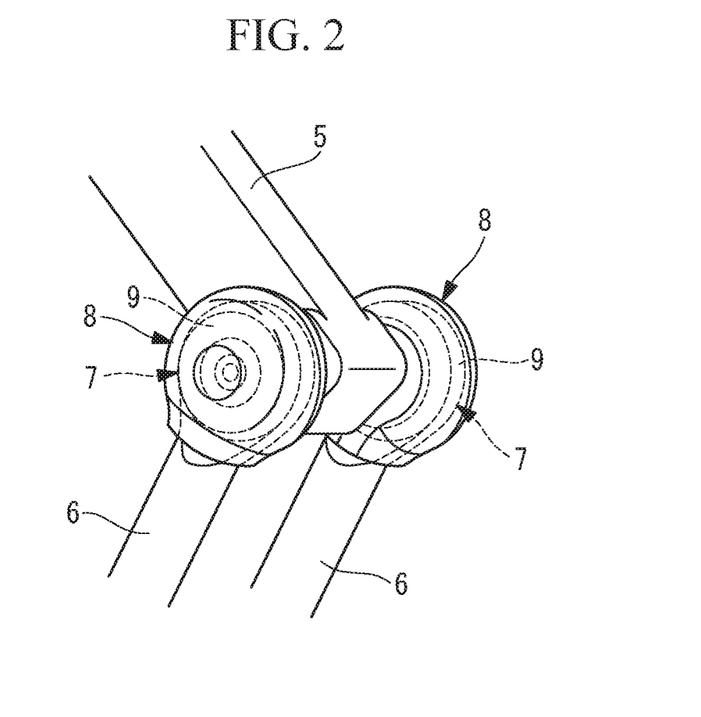
FIG. 2 is a perspective view of a joint between a driving link and a driven link of the parallel link robot of FIG. 1.
Figure 3:
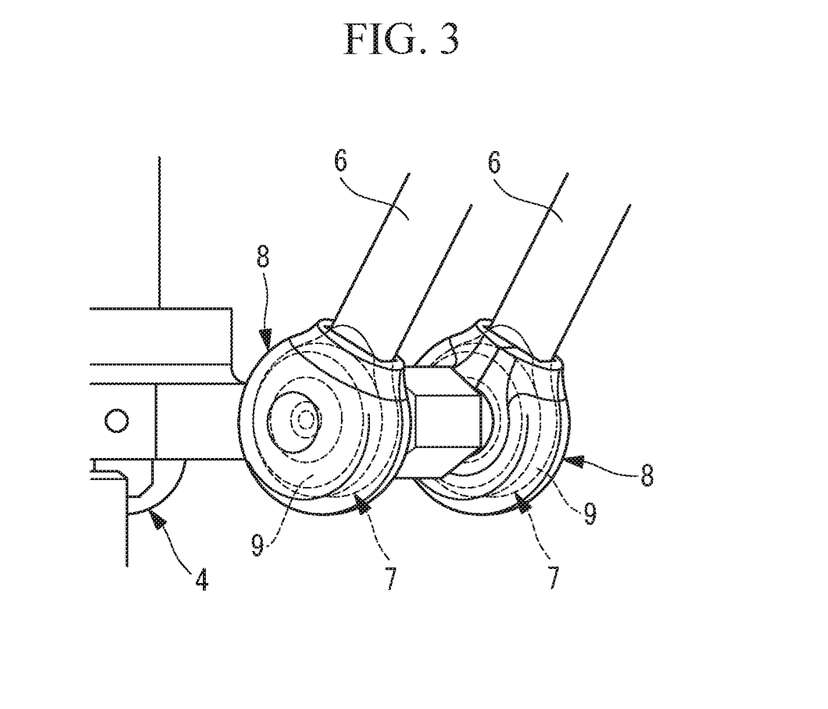
FIG. 3 is a perspective view of a joint between the driven link and an end part of the parallel link robot of FIG. 1.

Each arm 3 includes a driving link (the first joint member) 5 driven by the corresponding actuator, and a driven link (the second joint member) 6 at a position connecting the driving link 5 and the end part 4. A spherical bearing 7 (see FIG. 2) connects between the driving link 5 and the driven link 6 and another spherical bearing 7 connects between the driven link 6 and the end part 4, thus constituting respective joints. A joint cover 8 is disposed on each joint, as shown in FIGS. 2 and 3.

Figure 5:
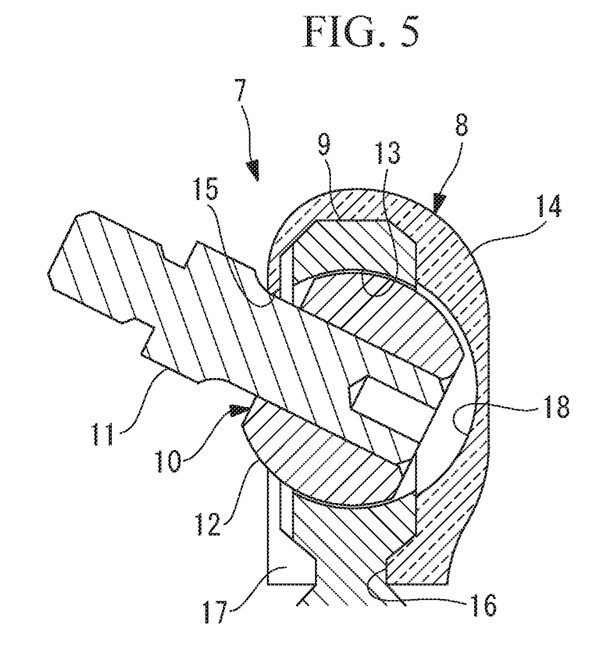
FIG. 5 is a longitudinal sectional view of a spherical bearing and the joint cover at the joint of the parallel link robot of FIG. 1.

As shown in FIG. 5, the spherical bearing 7 includes a holder 9 attached to each of both ends of the driven link 6, and a ball shank 10 fixed to each of the driving link 5 and the end part 4. The ball shank 10 includes a male threaded shaft part 11 and a ball part 12 at one end of the shaft part 11. The holder 9 is formed by expanding the corresponding one of the two ends of the driven link 6 into a disk shape, and includes at its center a ball receiver 13 that is an inner spherical surface enclosing and supporting the ball part 12.

In other words, the driven link 6 extending in a radial direction is connected to one circumferential position of the holder 9. Also, extending in an axial direction of the holder 9 is the ball shank 10 that is capable of swinging or rotating about a center of the ball part 12 with the ball part 12 accommodated in the ball receiver 13.

Figure 4:
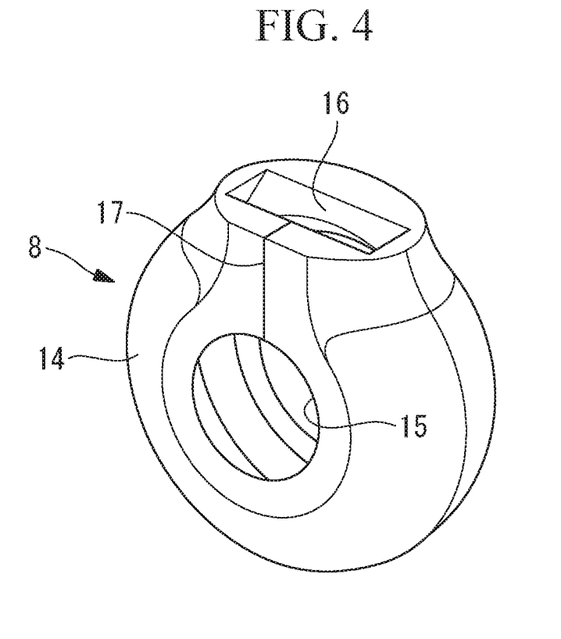
FIG. 4 is a perspective view of a joint cover according to the embodiment of the present invention.

As shown in FIG. 4, the joint cover 8 according to the present embodiment includes a hollow, disk-like cover body 14 having an inner space to accommodate the holder 9. The cover body 14 includes a first through-hole (the through-hole) 15 extending in the axial direction and allowing for insertion of the shaft part 11 of the ball shank 10, and a second through-hole (the through-hole) 16 extending in the radial direction at one circumferential position of the cover body 14 and allowing for insertion of the driven link 6.

The joint cover 8 according to the present embodiment further includes a linear slit 17 running in the radial direction from the first through-hole 15 up to the second through-hole 16. Opening the slit 17 by elastically deforming the cover body 14, which is made of an elastic material, makes the first through-hole 15 and the second through-hole 16 continuous with each other, forming a single large opening.

Upon insertion of the shaft part 11 of the ball shank 10 into the first through-hole 15 and insertion of the driven link 6 into the second through-hole 16, the slit 17 is closed by the elastic restoring force of the cover body 14. This separates the first through-hole 15 from the second through-hole 16.

As shown in FIG. 5, the joint cover 8 includes a recess 18 on the opposite side of the inner space from the first through-hole 15. The recess 18 is formed by recessing an inner wall of the joint cover 8. Also, the diameter of the first through-hole 15 is set such that an inner edge of the first through-hole 15 slightly contacts an outer surface of the shaft part 11 when the ball shank 10 is at the extreme end of its moving range.

A description will be given of the operation of the above configured joint cover 8 and parallel link robot 1 according to the present embodiment.

The joint cover 8 according to the present embodiment covers the spherical bearing 7, which constitutes each joint, including its contact portion between the ball part 12 and the ball receiver 13, as shown in FIG. 5. This can prevent abrasion powder produced by friction between the ball part 12 and the ball receiver 13 from being spilled to the outside. This can also prevent external dust from reaching a bearing surface between the ball part 12 and the ball receiver 13.

Further, the joint cover 8 is made of a transparent or translucent material. This allows for recognizing the presence of abrasion powder as it can be seen from the outside through the joint cover 8. In particular, the joint cover 8 includes the recess 18 formed by recessing its inner wall of the inner space. The produced abrasion powder thus tends to accumulate on the recess 18. Color density of the abrasion powder as seen from the outside through the joint cover 8 varies depending on the amount of accumulated abrasion powder. Thus, such color density can be used as an indicator of whether the abrasion powder should be removed or not.

Figure 6:
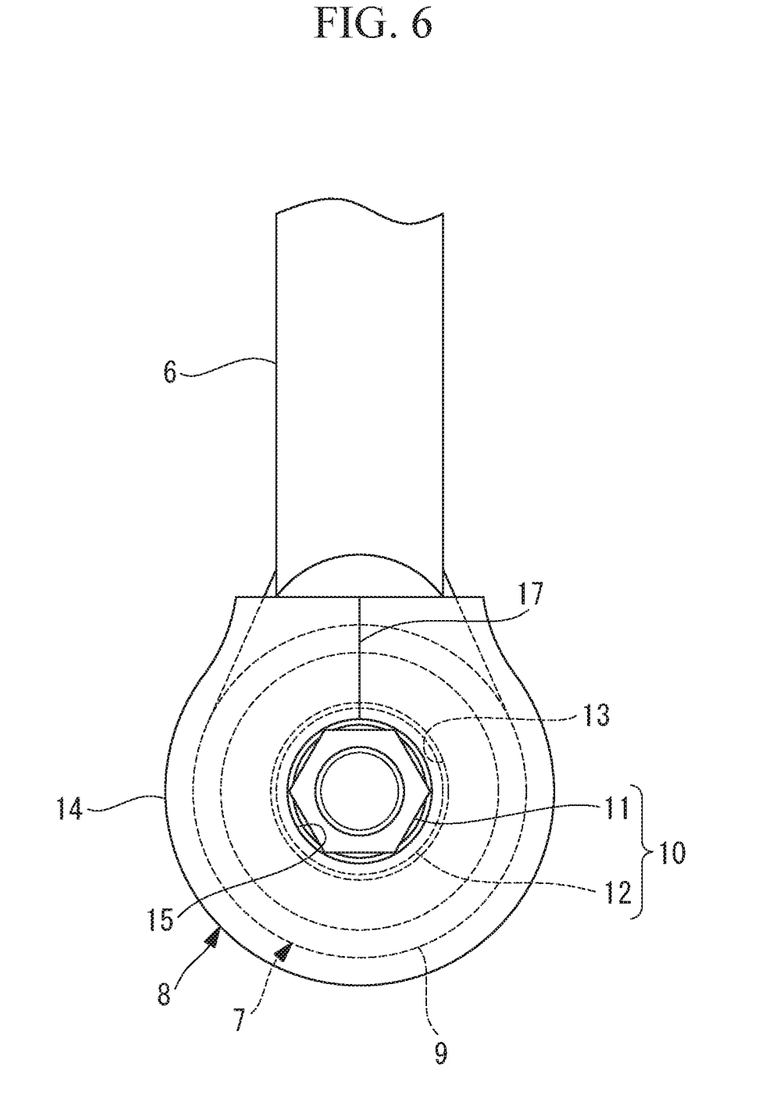
FIG. 6 is a front view of the joint cover when it is attached to the joint of the parallel link robot of FIG. 1.
Figure 7:
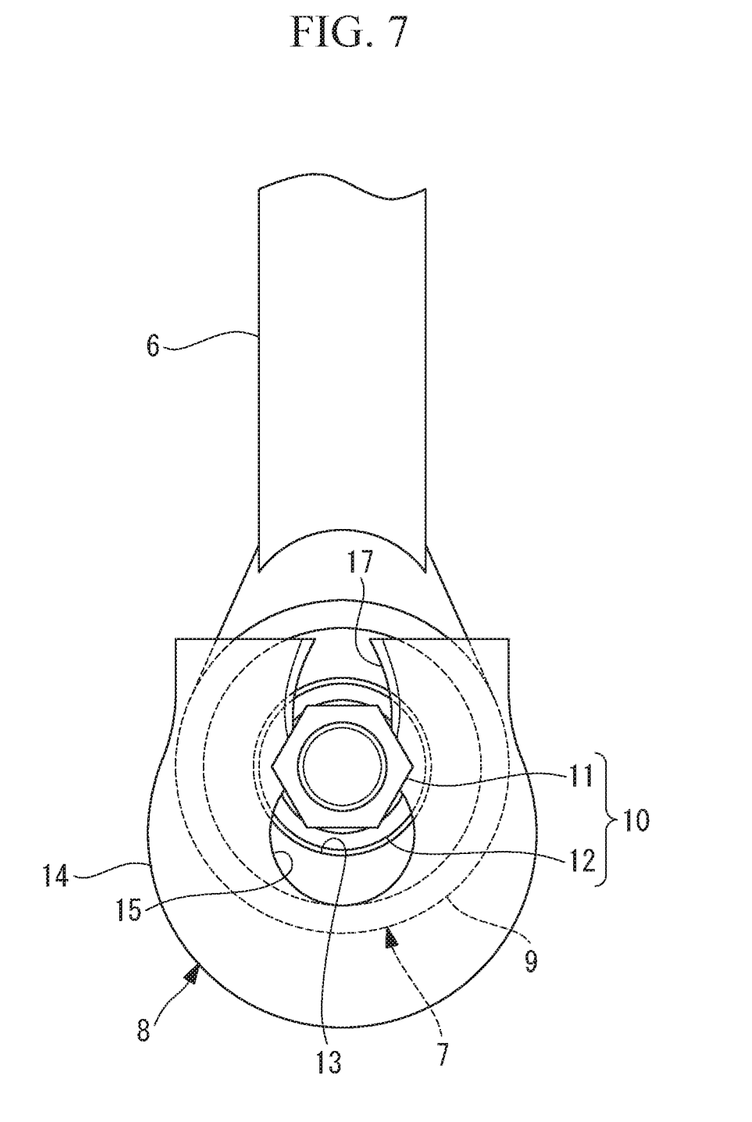
FIG. 7 is a front view of the joint cover of FIG. 6 when it is being removed from the joint.
Figure 8:
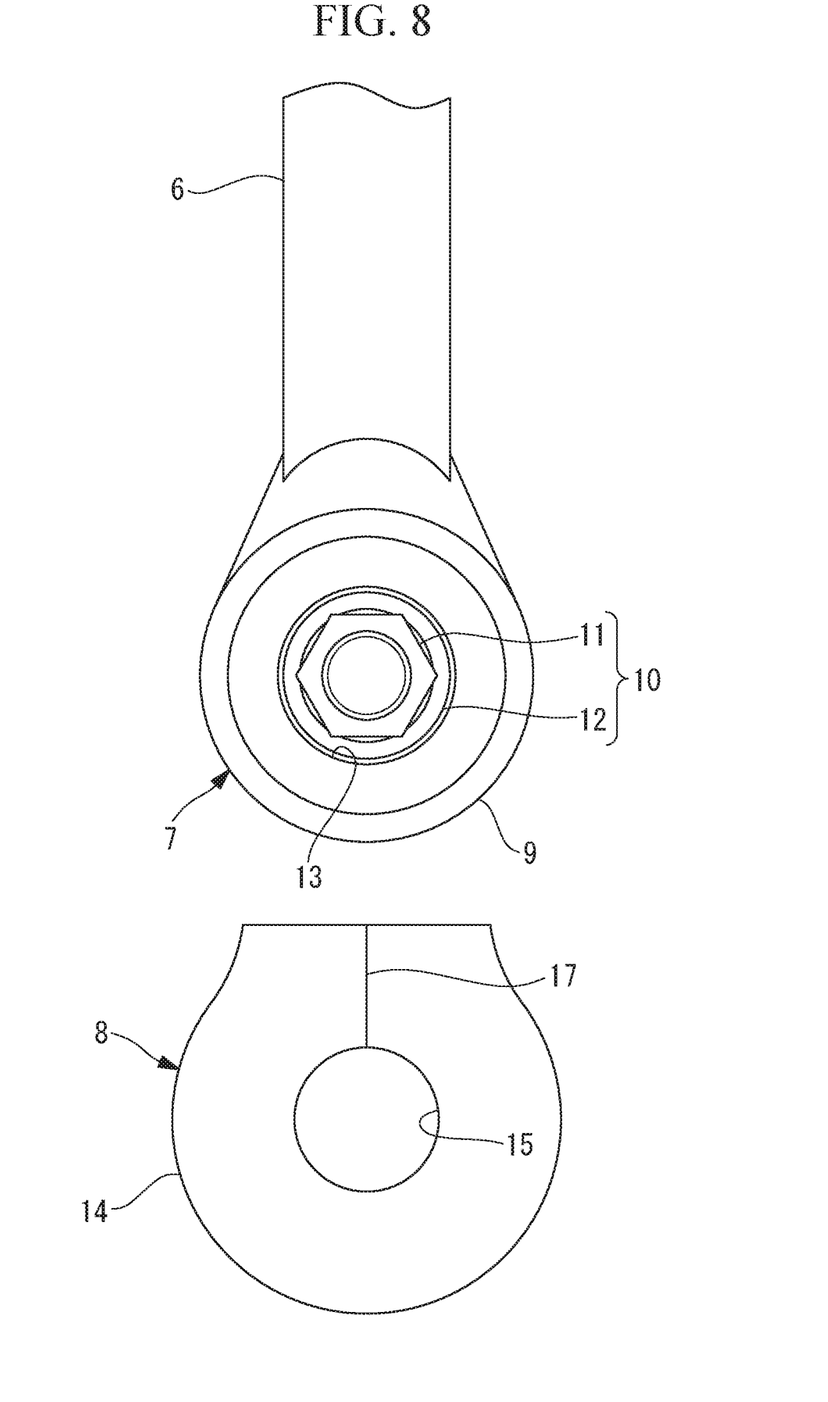
FIG. 8 is a front view of the joint cover of FIG. 6 after it is removed from the joint.

In replacing the joint cover 8, the slit 17 is widened to make the two through-holes 15, 16 continuous with each other and thus form a single large opening, and the cover body 14 is moved in a direction to pull out the holder 9 at the end of the driven link 6 from the inner space of the cover body 14, as shown in FIGS. 6 and 7. This results in the shaft part 11 of the ball shank 10 in the first through-hole 15 being moved to the second through-hole 16 through the slit 17, enabling removal of the joint cover 8 from the joint as shown in FIG. 8.

Since the two through-holes 15, 16 are connected by the slit 17, just opening the slit 17 enables removal of the joint cover 8, without the need to remove the shaft part 11 of the ball shank 10 from the driving link 5 or the end part 4. Thus, the joint cover 8 can be removed quickly without a tool.

In attaching the joint cover 8 from which abrasion powder has been removed or attaching a new joint cover 8, the slit. 17 is opened and, in a reverse manner to the above, the shaft part 11 of the ball shank 10 is moved into the first through-hole 15 through the open slit 17. Once the shaft part 11 fits in the first through-hole 15, the holder 9 gets accommodated in the inner space of the cover body 14. The open slit 17 is thus closed by the elastic restoring force, closing the gap between the two through-holes 15, 16, as shown in FIG. 6. This gives an advantage in that the joint cover 8 can also be attached quickly without a tool.

That is, the joint cover 8 and the parallel link robot 1 according to the present embodiment are advantageous in that the joint cover 8 can be added or replaced quickly without a tool and that the joint cover 8 can prevent abrasion powder from falling from the spherical bearing 7 and also prevent dust from reaching the bearing surface.

Figure 9:
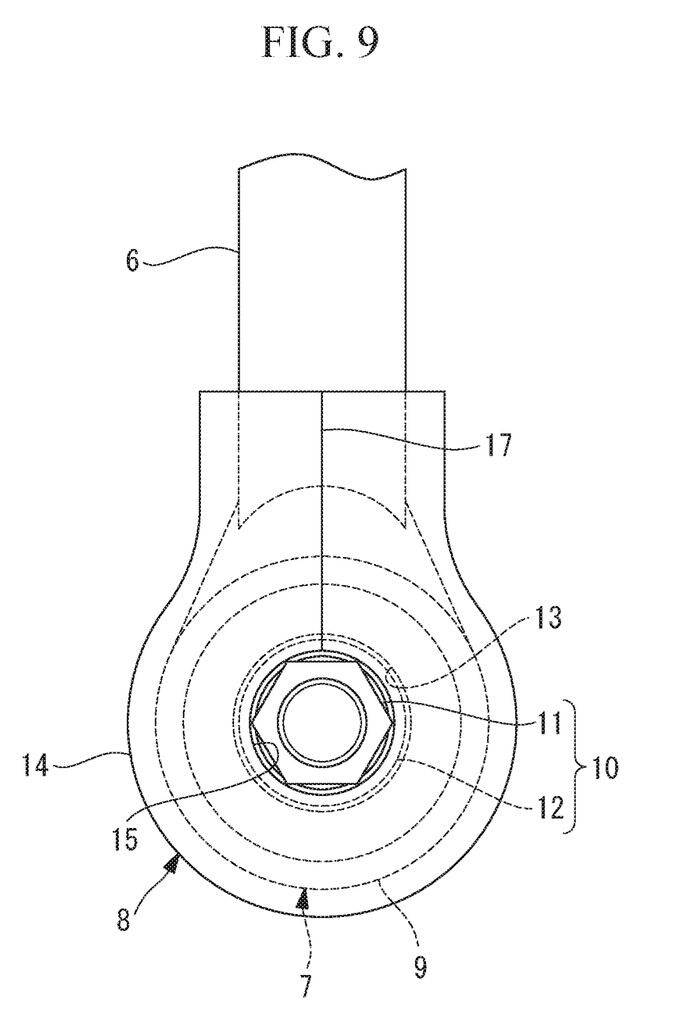
FIG. 9 is a front view of a modification of the joint cover of FIG. 4.

In the present embodiment, the portion of the joint cover 8 through which the driven link 6 passes may be elongated in a longitudinal direction of the driven link 6, as shown in FIG. 9. Covering the driven link 6 over a wider area in this way increases contact between the joint cover 8 and the driven link 6, preventing displacement and failing of the joint cover 8.

Figure 10:
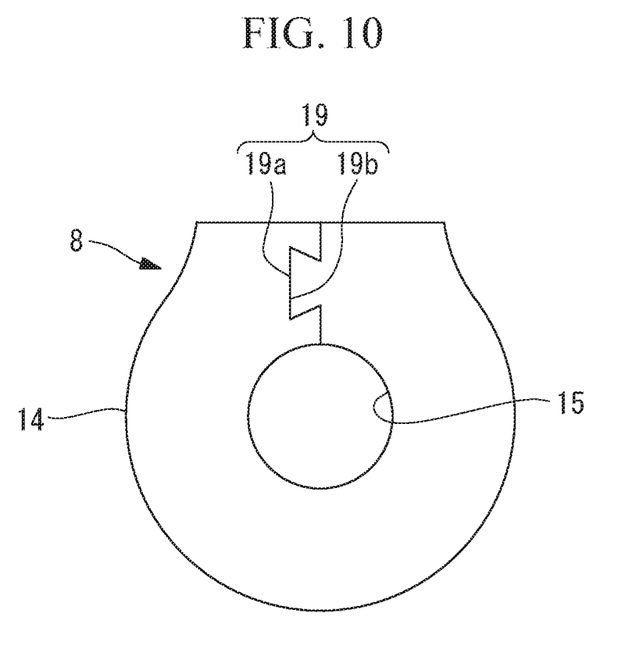
FIG. 10 is a front view of a modification of a slit in the joint cover of FIG. 4.
Figure 11:
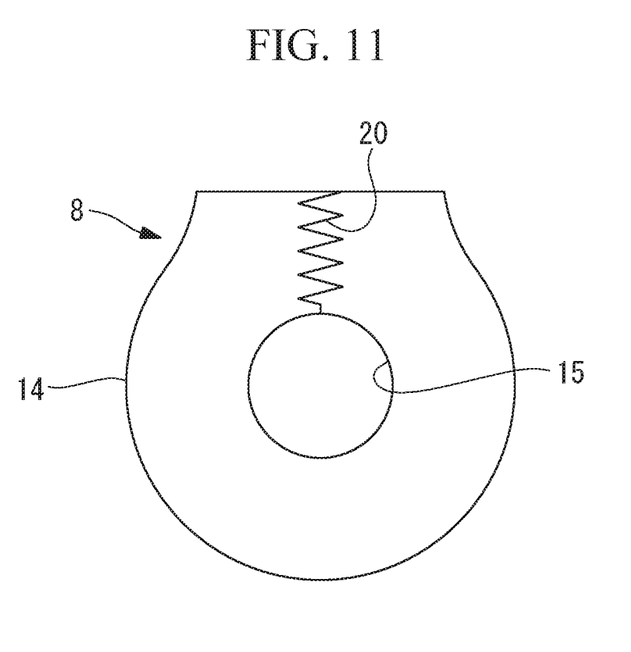
FIG. 11 is a front view of another modification of the slit in the joint cover of FIG. 4.

In the present embodiment, the slit 17 extends from the first through-hole 15 linearly in the radial direction, but this is by way of example only; instead of the linear slit 17, bent slit 19 or 20 may be used, as shown in FIGS. 10 and 11.

In the example shown in FIG. 10, the slit 19 is bent to form a dovetail tenon (the engaging part or the convex part) 19*a* and a dovetail groove (the engaging part or the concave part) 19*b* mating with each other when the slit 19 is closed. This allows for engagement of the closed slit 19 so that the slit 19 does not open, preventing displacement and failing of the joint cover 8.

Figure 12:
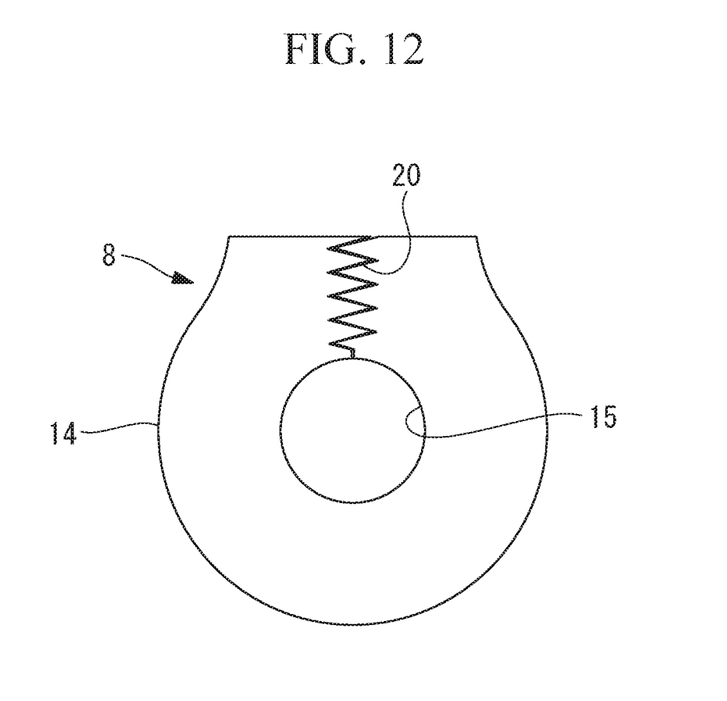
FIG. 12 is a front view of the slit of FIG. 11 when it is slightly opened.

In the example shown in FIG. 11, the slit 20 is bent in a zig-zag manner. This reduces a slit gap of the slit 20 even when it is slightly opened as shown in FIG. 12, preventing falling of abrasion powder and entry of dust.

From the above-described embodiment, the following invention is derived.

According to an aspect of a present invention, there is provided a joint cover removably attached to a joint of a robot, the robot including a first joint member, a second joint member, and a spherical bearing coupling the first joint member and the second joint member such that the first joint member and the second joint member are rotatable or swingable relative to each other, wherein the spherical bearing includes a ball shank and a holder, the ball shank including a shaft part fixed to the first joint member and a ball part at one end of the shaft part, the holder being fixed to an end of the second joint member and including a ball receiver configured to enclose and support the ball part, the joint cover includes a cover body made of an elastic material and configured to cover the holder and the end of the second joint member, and the cover body includes two through-holes respectively allowing for insertion of the shaft part and the second joint member, and the joint cover includes a slit configured to open and close and to make the two through-holes continuous with each other.

According to the aspect, in attaching the joint cover to a joint of the robot, the slit is opened to make the two thorough-holes continuous with each other and thereby form a large opening, and the holder and an end of the second joint member are inserted into the opening. Once the cover body is thus positioned to cover the holder and the end of the second joint member, the cover body closes the slit by the elastic restoring force of the cover body. This results in the shaft part of the ball shank being inserted in one of the two through-holes and the second joint member being inserted in the other of the two through-holes.

In other words, the joint cover can be attached to the position covering the spherical bearing attached between two joint members, without the need to remove the shaft part of the ball shank from the joint member. The joint cover can be thus added or replaced quickly without a tool and can also prevent falling of abrasion powder from the spherical bearing and entry of dust onto the bearing surface.

In the above aspect, the joint cover may include an engaging part configured to keep the slit closed.

This can more effectively prevent failing of abrasion powder from the spherical bearing and entry of dust onto the bearing surface.

In the above aspect, the engaging part may include a concave part and a convex part that are formed by bending the slit and mate with each other.

This allows to keep the slit closed by mating the convex part with the concave part.

In the above aspect, the concave part may have a dovetail groove shape, and the convex part may have a dovetail tenon shape.

This allows to prevent the slit from widening with a simple structure.

In the above aspect, the cover body may be made of a transparent or translucent resin material.

This allows to easily confirm, from the outside of the transparent or translucent cover body, abrasion powder produced in the spherical bearing, dirt in the lubricating material due to dust, and the like.

According to another aspect of the present invention, there is provided a robot including a plurality of the joints, wherein the joint cover of any one of the above aspect is attached to at least one of the plurality of joints.

According to another aspect of the present invention, there is provided a parallel link robot including: a base on which a plurality of actuators are mounted; a plurality of arms each coupled with a corresponding one of the plurality of actuators; and an end part attached to a distal end of each of the plurality of arms, wherein each of the plurality of arms includes a driving link driven by the corresponding one of the plurality of actuators, and a driven link positioned between the driving link and the end part, the parallel link robot further includes any of the above joint covers, and a plurality of the spherical bearings respectively connecting the driven link and the driving link and connecting the driven link and the end part, the first joint member is at least one of the driving link and the end part, and the second joint member is the driven link.

REFERENCE SIGNS LIST

1 Parallel link robot (robot)
2 Base
3 Arm
4 End part (the first joint member)
5 Driving link (the first joint member)
6 Driven link (the second joint member)
7 Spherical bearing
8 Joint cover
9 Holder
10 Ball shank
11 Shaft part
12 Ball part
13 Ball receiver
14 Cover body
15 First through-hole (through-hole)
16 Second through-hole (through-hole)
17, 19, 20 Slit
19a Dovetail tenon (engaging part, convex part)
19b Dovetail groove (engaging part, concave part)

The invention claimed is:

1. A joint cover removably attached to a joint of a robot, the robot including a first joint member, a second joint member, and a spherical bearing coupling the first joint member and the second joint member such that the first joint member and the second joint member are rotatable or swingable relative to each other, wherein the spherical bearing comprises a ball shank and a holder, the ball shank including a shaft part fixed to the first joint member and a ball part at one end of the shaft part, the holder being fixed to an end of the second joint member and including a ball receiver configured to enclose and support the ball part, the joint cover comprising:
  a cover body made of an elastic material and configured to cover the holder and the end of the second joint member, the cover body defining a first through hole allowing for insertion of the shaft part and a second through hole allowing for insertion of the second joint member; and
  a slit configured to open and close and to make the two through-holes continuous with each other; and
  wherein the joint cover is closed on a side opposite the first through hole.

2. The joint cover according to claim 1, wherein the slit comprises an engaging part configured to keep the slit closed.

3. The joint cover according to claim 2, wherein the engaging part comprises a concave part and a convex part that are formed by bending the slit and mating the concave part and the convex part with each other.

4. The joint cover according to claim 3, wherein the concave part has a dovetail groove shape, and the convex part has a dovetail tenon shape.

5. The joint cover according to claim 1, wherein the cover body is made of a transparent or translucent resin material.

6. A robot comprising a plurality of joints, wherein a joint cover according to claim 1 is attached to at least one of the plurality of joints.

7. A parallel link robot comprising:
  a base on which a plurality of actuators are mounted;
  a plurality of arms, each of the plurality of arms coupled with a corresponding one of the plurality of actuators; and
  an end part attached to a distal end of each of the plurality of arms;
  wherein each of the plurality of arms includes a driving link driven by the corresponding one of the plurality of actuators and a driven link positioned between the driving link and the end part;
  a joint cover according to claim 1;
  a plurality of the spherical bearings respectively connecting the driven link and the driving link and connecting the driven link and the end part;
  wherein the first joint member is at least one of the driving link and the end part; and
  wherein the second joint member is the driven link.

8. The joint cover according to claim 1, wherein the joint cover is unitary.

9. The joint cover according to claim 1, wherein an inner space defined by an inner wall comprises a recess opposite the first through hole.

10. The joint cover according to claim 9, wherein the recess is adapted to accumulate abrasion powder.

\* \* \* \* \*